US008378609B2

(12) United States Patent
Marchetto et al.

(10) Patent No.: US 8,378,609 B2
(45) Date of Patent: Feb. 19, 2013

(54) SAFETY DEVICE FOR AN ACTUATING SYSTEM FOR ROLLER SHUTTERS OR SLIDING BARRIERS

(75) Inventors: Oscar Marchetto, Oderzo (IT); Alberto Codognotto, Levada di Ponte di Piave (IT)

(73) Assignee: Nice SpA, Oderzo (Treviso) (IT)

( * ) Notice: Subject to any disclaimer, the term of this patent is extended or adjusted under 35 U.S.C. 154(b) by 533 days.

(21) Appl. No.: 12/303,569

(22) PCT Filed: Apr. 1, 2008

(86) PCT No.: PCT/IB2008/051213

§ 371 (c)(1),
(2), (4) Date: May 19, 2009

(87) PCT Pub. No.: WO2008/122922

PCT Pub. Date: Oct. 16, 2008

(65) Prior Publication Data

US 2009/0320372 A1 Dec. 31, 2009

(30) Foreign Application Priority Data

Apr. 6, 2007 (IT) .............................. TV2007A0062

(51) Int. Cl.
*H02P 1/00* (2006.01)

(52) U.S. Cl. ........................................ 318/445; 318/461

(58) Field of Classification Search .................. 318/286, 318/445, 449, 461, 466, 468, 471, 432, 434, 318/480

See application file for complete search history.

(56) References Cited

U.S. PATENT DOCUMENTS

| | | | | |
|---|---|---|---|---|
| 5,334,876 | A * | 8/1994 | Washeleski et al. | 307/10.1 |
| 6,092,338 | A * | 7/2000 | Crowner et al. | 49/360 |
| 6,906,487 | B2 * | 6/2005 | de Frutos | 318/468 |
| 7,034,487 | B1 * | 4/2006 | Murphy et al. | 318/466 |
| 7,132,813 | B2 * | 11/2006 | Gregori et al. | 318/466 |
| 7,180,260 | B2 * | 2/2007 | Murphy et al. | 318/466 |

FOREIGN PATENT DOCUMENTS

EP 0 703 344 3/1996

OTHER PUBLICATIONS

International Search Report and the Written Opinion of the International Searching Authority dated Aug. 4, 2008, for corresponding International Application PCT/IB2008/051213.

* cited by examiner

*Primary Examiner* — Rina Duda

(74) *Attorney, Agent, or Firm* — Katten Muchin Rosenman LLP

(57) ABSTRACT

Motor-driven actuating system for roller shutters or sliding barriers or the like, provided with an obstacle-sensing safety device for acquiring samples ($\zeta(\phi n)$) of at least one main physical parameter ($\zeta$) relating to operation of the actuating system, preferably the torque supplied by the motor, sampled in a set of positions ($\phi n$) of the roller shutter along its travel path; for generating from the samples the points of a memorized reference profile (M; W); processor able to calculate the deviation between the profile (M; W) and values subsequently acquired in real time ($\zeta(\phi k)$) for the same main parameter ($\zeta$) and able to modify the movement of the roller shutter depending on the deviation, wherein the device is designed to analyze and/or process the result of one or more arithmetic logic operations which have as the operand at least the value ($\Psi(\phi k)$) of a variable ($\Psi$) acquired in real time, and, depending on the result, modify the points of the profile (M; W) with operations based on previously memorized values.

31 Claims, 3 Drawing Sheets

| | | | | |
|---|---|---|---|---|
| | -20% | -10% | -10% | +10% |
| >> | >> | >> | >> | >> |
| < 0°C | 0÷15°C | 15÷35°C | 35÷55°C | >55°C |
| << | << | << | << | << |
| +20% | +10% | +10% | -10% | |

SAFETY DEVICE FOR AN ACTUATING SYSTEM FOR ROLLER SHUTTERS OR SLIDING BARRIERS

BACKGROUND OF THE INVENTION

1. Field of the Invention

The invention relates to a safety device for an actuating system for roller shutters or sliding barriers, the actuating system which incorporates it and the operating method used in it. In particular it relates to an obstacle-sensing protection device. For the sake of simplicity of the description, reference will be made solely to actuating systems for roller shutters, it being understood that the invention may also be applied to automated systems for gates, curtains, external shutters, sliding barriers, doors, garage entrances and the like.

2. Description of the Related Art

In actuating systems for roller shutters, the torque supplied by the electric motor during the movement is not constant over the entire travel path of the roller shutter (opening and/or closing), but varies according to the instantaneous requirement. This is due to the variation in the forces at play and in particular to the variation in the weight of the roller shutter which, during movement of the latter, stresses the motor in a varying manner (gradually increases during the downward movement and gradually decreases during the upward movement). As a result the motor increases or decreases gradually the torque produced in order to keep the speed of the roller shutter more or less constant.

The actuating systems for roller shutters incorporate obstacle-sensing devices in order to intervene immediately, usually stopping the shutter and reversing for a short travel the direction of movement of the motor, in the event of accidental impact with persons or objects.

The obstacle-sensing devices may be of the mechanical or electronic type. The first type generally make use of a mechanical play in order to activate or deactivate a switch which causes stoppage of the motor, see, for example, EP 0 497 711, EP 0 552 459 and FR 2 721 652. The second type—see FIG. 1—generally use the technique of measuring (for example by means of an encoder) a physical parameter ($\zeta$) relating to the operation of the actuating system, denoted here by $\zeta$ and called main parameter, in correspondence with a series of positions $\phi_n$ of the roller shutter along its travel path (n=the number of samples) in order to obtain actual analog values $\zeta(\phi_k)$. Here and below the dependency on $\phi_k$ for a parameter indicates that the parameter is acquired in real time and in correspondence with the k-th position, while the generic subscript n in $\phi_n$ for $\zeta(\phi_n)$ is used to indicate genetically the acquisition in real time for all the n positions, namely a profile of $\zeta$. After sampling, the values $\zeta(\phi_n)$ are digitally converted into digital values $\zeta_M(\phi_n)$ (the subscript M indicates here and below an acquired and memorized value) and are stored (or "mapped") in an ordered manner to form a profile M.

Another advantageous technique is described in the application PCT/EP 0 668 183 in the name of the Applicant. Here the measurement method implemented in the actuating system is able to monitor and map directly the mechanical parameters of the blind and not only the electrical parameters of the motor, namely it is possible to control the force imparted by or onto the roller shutter even when die motor is at a standstill. The "mapping" operation preferably requires two stored profiles, i.e. one for the opening movement and one for the closing movement (they are not necessarily the same).

Usually the values refer $\zeta(\phi_n)$ refer to the electric current, to the electric power, to the speed or to the torque produced by the electric motor or to the resisting torque which acts on the roller shutter and/or the motor. Below the function $\zeta$ will indicate these parameters or similar electrical and/or mechanical parameters, preferably the driving torque required to obtain a desired profile for the movement of the roller shutter.

It should be noted that the first mapping M or a new mapping of an actuating system must be performed by specialised personnel during the course of a specific programming procedure. In the known systems a complete mapping M is performed with the first operation during installation where the roller shutter is moved from one end-of-travel position to the other one (and vice versa) and then remains valid permanently (or until a new programming/installation cycle is performed).

The profile M is regarded by the system as a reference and/or normal use profile. During the movement of the roller shutter, the values $\zeta_M(\phi_k)$ of the profile M are compared, in real time, with the respective instantaneous values $\zeta(\phi_k)$, in order to detect any anomaly with respect to the stored profile M.

A series of phenomena, for example structural "microphenomena" which are difficult to predict, such as vibrations and resonances of the structure or the sliding systems, have the effect that an invariable profile M for all the operations is not optimal. In practice it is best to take into account a "background noise" which is superimposed on the profile M and allow for suitable margins of intervention.

Therefore, a tolerance range W is calculated around the profile M, this range comprising values $\zeta_W(\phi_k)|_{inf}$ and $\zeta_W(\phi_k)|_{sup}$ where the subscripts "sup" and "inf" indicate the upper and lower range values, respectively, by adding or subtracting a tolerance threshold S (or maximum deviation value) to/from the values $\zeta_M(\phi_k)$.

The calculation operation for each point is $\zeta_W(\phi_k)|_{inf}=\zeta_M(\phi_k)-S$ and $\zeta_W(\phi_k)|_{sup}=\zeta_M(\phi_k)+S$, with S being a fixed value.

For example, in FIG. 1, the measured value $\zeta(\phi_k)|_1$ ($1\leqq k\leqq n$) would be a permitted value, while $\zeta(\phi_k)|_2$ would activate the protection system. Another example, if the mapped value $\zeta_M(\phi_k)$ were 50 and a tolerance threshold S (or deviation value) equivalent to 20% of $\zeta_M(\phi_k)$ is assumed, activation of the protection system would be obtained for $\zeta(\phi_k)<\zeta_W(\phi_k)|_{inf}=40$ or $\zeta(\phi_k)>\zeta_W(\phi_k)|_{sup}=60$. All the variations which may occur between the first operation and all the following operations are thus concentrated in the tolerance (or indifference) range W.

These systems may, however, may be improved.

In order to avoid false responses it is necessary for die value S of the tolerance threshold to be sufficiently wide. However, activation of the obstacle-sensing protection system is ensured only when an obstacle produces a detected value $\zeta(\phi_k)$ falling outside the range W.

Since the range W is also a range of insensitivity/indifference to obstacles, too large a deviation S may also undermine safety because it widens the range W excessively.

In the case where the mapped parameter $\zeta_M(\phi_n)$ is the torque, the tolerance threshold S is proportional to the (impact) force which acts on (or must be withstood by) the obstacle before the activation of the obstacle-sensing protection system reverses the movement of the motor. In some cases, as for example in the case of shutters for shops (or garage entrances), where the weight involved is considerable, the force to which the obstacle could be exposed may however be excessive.

For this reason, an efficient obstacle-sensing protection device must be characterized by very small tolerance threshold values S.

Moreover, there are phenomena, such as wear of the structure, loss of efficiency by the balancing systems (springs) or climatic (seasonal) changes which produce a slow, but gradual change in the values measured $\zeta(\phi_n)$.

Therefore the values $\zeta_M(\phi_n)$ and the corresponding values $\zeta(\phi_n)$ measured in real time gradually diverge from each other, something which over time may result in the range W being exceeded in one or more positions $\phi_k$ and increasingly frequent false responses/interventions.

SUMMARY OF THE INVENTION

The object of the invention is to provide an obstacle-sensing device for an actuating system which does not possess the drawbacks mentioned above. Another object is to provide a method which avoids the disadvantages described for the known devices.

This object is achieved with a motor-driven actuating system for roller shutters or sliding barriers or the like, provided with an obstacle-sensing safety device having:

- means for acquiring samples ($\zeta(\phi_n)$) of at least one main physical parameter ($\zeta$) relating to operation of the actuating system, preferably the torque supplied by the motor, which are sampled in correspondence of a set of positions ($\phi_n$) of the roller shutter within its travel path;
- means for generating from said samples the points of a stored reference profile (M; W);
- processing means able to calculate the deviation between the profile (M; W) and values subsequently acquired in real time ($\zeta(\phi_k)$) for the same main parameter ($\zeta$) and able to modify the movement of the roller shutter depending on the deviation;

characterized in that the device is designed to analyze and/or process the result of one or more arithmetic logic operations having as an operand at least the value ($\Psi(\phi_k)$) of a variable ($\Psi$) acquired in real time and, according to said result, modify the points of the profile (M; W) with operations based on previously stored values.

Therefore, the invention is based on the intelligent updating of $\zeta_M(\phi_k)$ and/or S, and/or $\zeta_W(\phi_k)$, by means of a suitable algebraic and/or logic function F (comparisons, Boolean functions, etc.) which can be generally expressed analytically as $F(\Psi)$. An advantageous variant envisages using in the function F one or more additional operands consisting of stored values $\Psi_M$ of the said variable $\Psi$ acquired in real time. Then the function F is generally expressed analytically as $F(\Psi_M, \Psi)$.

The values stored previously and used to modify the values of the profile (M; W) and/or the tolerance thresholds (S) may be constant values or, more conveniently, values calculated from the same stored values of the profile (M; W) and/or of the tolerance thresholds (S).

Since the current value $\zeta(\phi_k)$ triggers the activation of the protection system when $\zeta(\phi_k)>\zeta_W(\phi_k)|_{sup}$ or $\zeta(\phi_k)<\zeta_W(\phi_k)|_{inf}$ namely when $\zeta(\phi_k)>(\zeta_M(\phi_k)+S)$ or $\zeta(\phi_k)<(\zeta_M(\phi_n)-S)$, control of the comparison terms $(\zeta_M(\phi_k)+S)$ and $(\zeta_M(\phi_n)-S)$ allows programming/variation in real time of the operating parameters and intervention conditions of the obstacle-sensing device.

Updating/modifying $\zeta_M(\phi_k)$ and the values S is equivalent to updating/modifying $\zeta_W(\phi_k)|_{sup}$ and $\zeta_W(\phi_k)|_{inf}$, since $\zeta_W(\phi_k)|_{sup,inf}=\zeta_M(\phi_k)\pm S$. Vice versa, updating/modifying $\zeta_M(\phi_k)$ and $\zeta_W(\phi_k)|_{sup,inf}$ is equivalent to updating/modifying also values S, i.e. for example rendering them $S(\phi_k)$.

Depending on the choice to modify $\zeta_M(\phi_k)$ and/or S (or correspondingly $\zeta_W(\phi_k)$) and the arithmetic logic operations $F(\Psi)$ or $F(\Psi_M, \Psi)$ which update and/or modify their values, various advantageous possibilities are obtained with the invention.

If the —preferably digital —stored value $\Psi_M$ of the variable $\Psi$ corresponds to one or more values $\zeta_M(\phi_k)$ and the value measured in real time $\Psi(\phi_k)$ corresponds to one or more values $\zeta(\phi_k)$, a first variant and second variant are obtained, see Variant I e Variant II.

If the memorized value $\Psi_M$ of the variable $\Psi$ corresponds to one or more values $\sigma_M(\phi_k)$ of a parameter $\sigma$ different from $\zeta$ as defined and the value measured in real time $\Psi(\phi_k)$ corresponds to one or more values $\sigma(\phi_k)$, a third variant, i.e. Variant III, is obtained.

If the memorized value $\Psi_M$ of the variable $\Psi$ corresponds to one or more values $X_M(\phi_k)$ of one or more internal state variables X of the actuating system (for example the contents of memory locations) and the value measured in real time $\Psi(\phi_k)$ corresponds to one or more values $X(\phi_k)$ of X, a fourth variant, i.e. Variant IV, is obtained.

Moreover, the invention envisages a method for improving the efficiency of a motor-driven actuating system for roller shutters or sliding barriers or the like, provided with an obstacle-sensing protection device, comprising the steps of:

- acquiring samples ($\zeta(\phi_n)$) of at least one main physical parameter ($\zeta$) relating to operation of the actuating system, preferably the torque supplied by the motor, sampled in correspondence of a set of positions ($\phi_n$) of the roller shutter along its travel path;
- generating from the said samples the points of a stored reference profile (M; W);
- calculating the deviation between the profile (M; W) and values subsequently acquired in real time ($\zeta(\phi_k)$) for the same main parameter ($\zeta$) and modifying the movement of the roller shutter depending on the deviation;

characterized by analyzing and/or processing the result of one or more arithmetic-logic operations having as operand at least the value ($\Psi(\phi_k)$) of a variable ($\Psi$) acquired in real time and, depending on the result, modifying the points of the profile (M; W) with operations based on previously stored values.

BRIEF DESCRIPTION OF THE DRAWINGS

The advantages of the invention will be explained more fully by the following description of a preferred embodiment, illustrated in the accompanying drawing, where.

DETAILED DESCRIPTION OF THE INVENTION

Figures 1, 2:
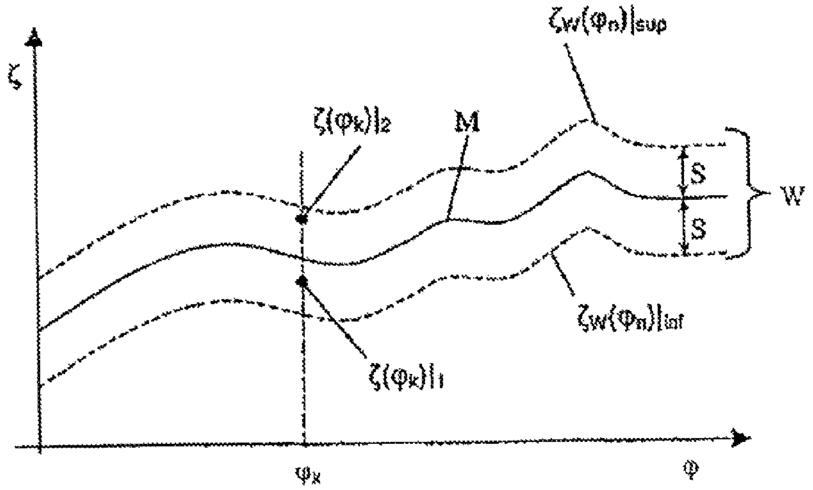
PRIOR ART Fig. 1
FIG. 1 shows a mapping of a known actuating system.
FIG. 2 shows a calculation table.
Figure 3A:
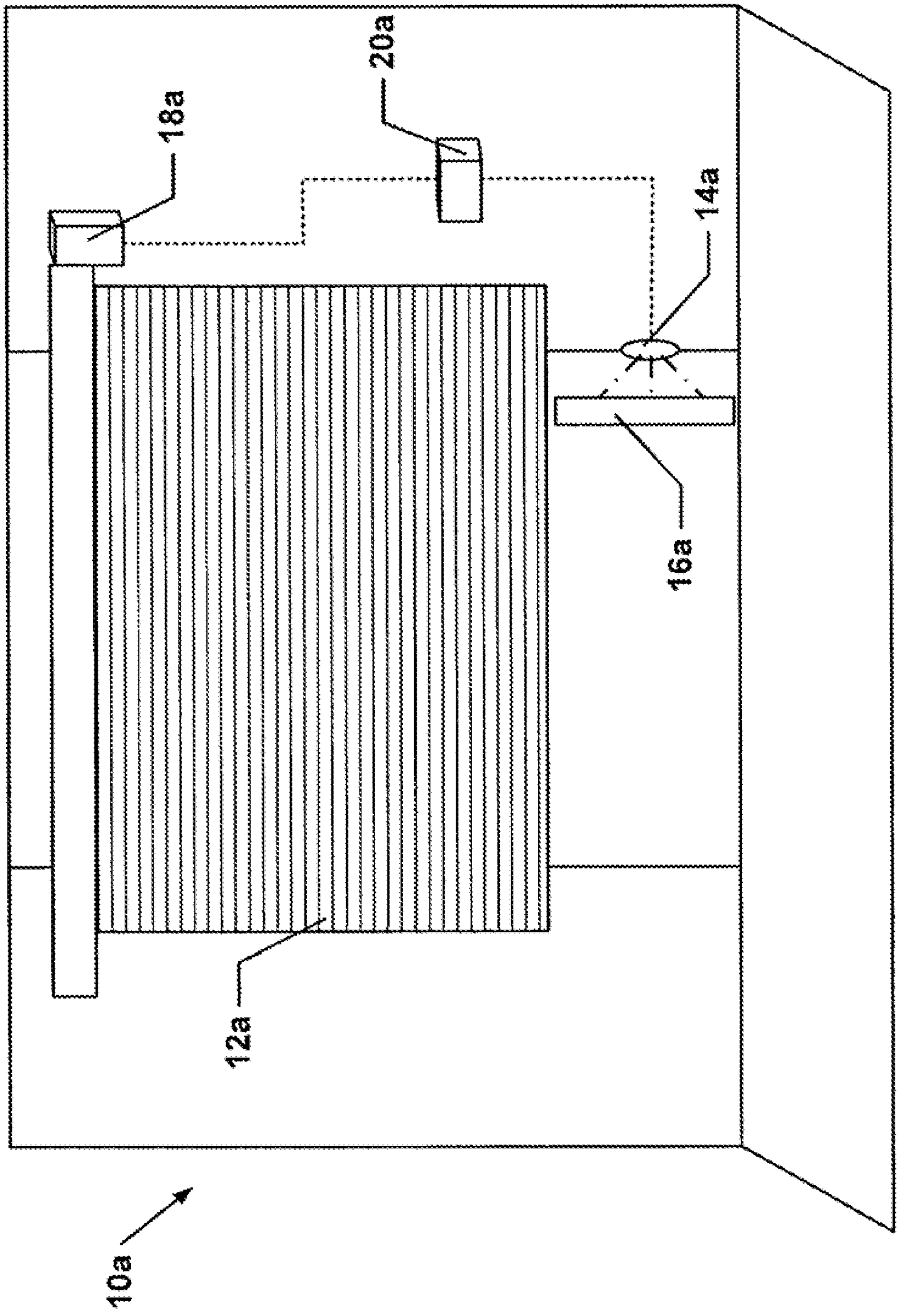
FIG. 3*a* is an elevation view of a rolling shutter.
Figure 3B:
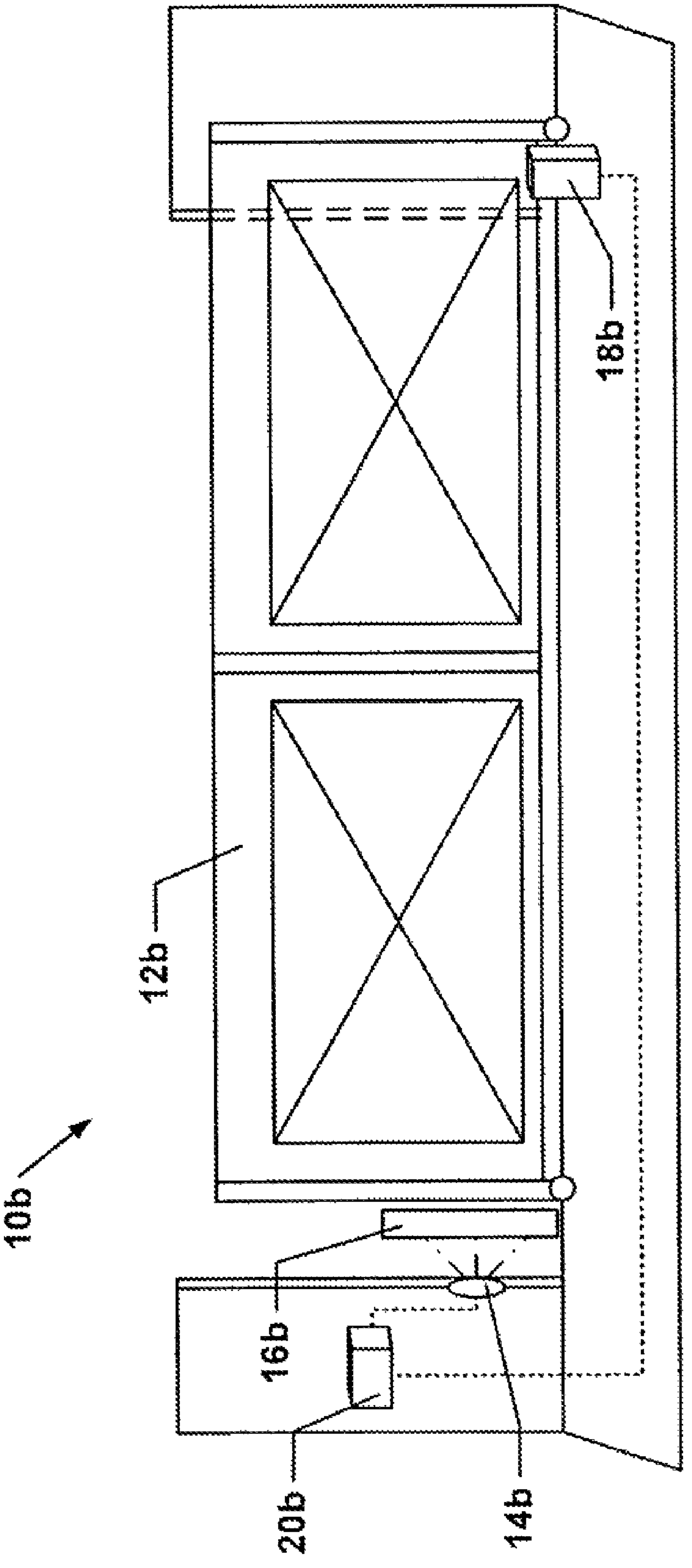
FIG. 3*b* is an elevation view of sliding barrier.

A motor driven actuating system 10*a* for a roller shutter 12*a* includes an obstacle-sensing device 14*a* for sensing an obstacle 16*a*. A motor 18*a* provides a torque. A processing means 20*a* calculates the deviation between profile and the real-time position of the shutter.

A motor driven actuating system 10*b* for a sliding barrier 12*b* includes an obstacle-sensing device 14*b* for sensing an obstacle 16*b*. A motor 18*b* provides a torque. A processing means 20*b* calculates the deviation between profile and the real-time position of the barrier.

Variant I ($\Psi \equiv \zeta$)

The invention in this case makes use of the fact that the noise and/or fluctuation phenomena described above evolve slowly and progressively. Therefore the profile M is updated whenever a manoeuvre of the roller shutter is performed.

Preferably said manoeuvre involves the entire travel movement of the roller shutter, but it could only concern a section of the said travel movement.

The profile M according to the invention in the case of this variant relates to the torque values supplied by the motor, but other main physical parameters may also be considered, also in combination with each other. Therefore, here $\zeta$=torque supplied by the motor.

If the current manoeuvre has been performed without activation of the obstacle sensor (otherwise there is the risk of updating the profile M with data due to the greater stress caused by the obstacle), for each point $\phi_k$, $1 \leqq k \leqq n$, of the profile M the value $\zeta(\phi_k)$ acquired in real time during the manoeuvre in progress is compared with the related stored value $\zeta_M(\phi_k)$, in order to verify the amount by which the former differs from the latter. Therefore (i) If the arithmetic operation for calculation of the deviation $|\zeta_M(\phi_k)-\zeta(\phi_k)|$ results in a value greater than a first tolerance threshold $S_1$, for example $0.10*\zeta_M(\phi_k)$, the protection system intervenes;

(ii) if the arithmetic operation $|\zeta_M(\phi_k)-\zeta(\phi_k)|$ results in a value less than $S_1$ but greater than a second tolerance threshold $S_2$, e.g. $0.03*\zeta_M(\phi_k)$, then $\zeta_M(\phi_k)$ is updated with the (for example) 25% of $|\zeta(\phi_k)-\zeta_M(\phi_k)|$. Updating of the single value $\zeta_M(\phi_k)$ is preferably not performed using 100% of the deviation because, if it consists of an occasional variation (for example a gust of wind), it must not upset the profile M; if, on the other hand, it consists of an event of long duration, after a few maneuvers complete updating in keeping with the operating conditions is obtained.

(iii) if, on the other hand, the deviation $|\zeta_M(\phi_k)-\zeta(\phi_k)|$ is less than $S_2$ the profile M is not updated because it is assumed that it is caused by "noise".

Numerical example: if the value $\zeta_M(\phi_k)$ in the profile M is 50 and the value $\zeta(\phi_k)$ acquired during the current manoeuvre is 49 (difference=−2%), updating is not performed; if, on the other hand, the value acquired $\zeta(\phi_k)$ is 46 (difference=−8%) then the value $\zeta_M(\phi_k)$ is updated with the 25% of the difference; and therefore the new value $\zeta_M(\phi_k)$ will be 49.

Essentially a term, which is a function of $|\zeta(\phi_k)-\zeta_M(\phi_k)|$ or is also constant, is added to (or subtracted from) the value $\zeta_M(\phi_k)$ in order to obtain the new value. If the values of the tolerance thresholds $S_1$ and/or $S_2$ are a function of the point, i.e. $S_1=S_1(\phi_k)$ and/or $S_2=S_2(\phi_k)$, the range W may have different amplitudes in different sections of the profile M (see also Variant II); and the tolerance thresholds $S_2$ used to decide updating may be different in order to adapt better the behaviour of the actuating system to the roller shutter and its environment.

In order to obtain the same result described, it is possible to memorize only the profiles of the range W with the values $\zeta_W(\phi_k)|_{sup}$ and $\zeta_W(\phi_k)|_{inf}$. Another arithmetic-logic operation may envisage the following different algorithm, where the value of the profile M is calculated by means of the average of $\zeta_W(\phi_k)|_{sup}$ and $\zeta_W(\phi_k)|_{inf}$ and is not stored:

(i) if $\zeta(\phi_k)>\zeta_W(\phi_k)|_{sup}$ or $\zeta(\phi_k)<\zeta_W(\phi_k)|_{inf}$ action is taken;

(ii) otherwise $\zeta_M(\phi_k)=(\zeta_W(\phi_k)|_{sup}+\zeta_W(\phi_k)|_{inf})/2)$ is calculated and the procedure described in the steps above is followed. If updating is required, the values of the range W are updated for example with the 25% of $\zeta_M(\phi_k)$ with:

$$\zeta_W(\phi_k)|_{sup}=0.25\cdot((\zeta_W(\phi_k)|_{sup}+\zeta_W(\phi_k)|_{inf})/2)+\zeta_W(\phi_k)|_{sup};$$

$$\zeta_W(\phi_k)|_{inf}=-0.25\cdot((\zeta_W(\phi_k)|_{sup}+\zeta_W(\phi_k)|_{inf})/2)+\zeta_W(\phi_k)|_{inf}.$$

Instead of having a value $\zeta_M(\phi_k)$ then adding S to it, in an equivalent manner the numerical limits of the range W are stored.

Variant II ($\Psi \equiv \zeta$)

An advantageous possibility of the invention, which can be used in combination with the other variants, is to implement for the decision of intervention an adaptive intervention range W, the values $\zeta_W(\phi_k)|_{sup}$, $\zeta_W(\phi_k)|_{inf}$ of which are calculated on the basis of a value, which quantifies the "response risk" during the previous manoeuvre.

The method according to the invention acts in such a way as to keep the profile M or the range W updated in accordance with the real values acquired during the maneuvers.

As already mentioned, the value of the tolerance thresholds S may be added algebraically to the values $\zeta_M(\phi_n)$ of the profile M in order to obtain the values $\zeta_W(\phi_n)|_{sup}$, $\zeta_W(\phi_n)|_{inf}$ of the range W outside of which intervention of the protection system takes place.

In the known simpler systems, the value of the tolerance thresholds S is fixed (for example ±10% of $\zeta_M(\phi_n)$). However, it often occurs that, depending on the size of the blind or the type of structure, the "noise" fluctuations may be greater or smaller with the risk of false interventions. In other systems, therefore, a value for the tolerance thresholds S which can be adjusted during installation (e.g. from ±10% to ±30% of $\zeta_M(\phi_n)$) is introduced, although however it remains fixed until the next adjustment performed by an installation operator. This give rise to problems of false interventions or insensitivity to detect obstacles.

The invention solves the problem with the following method. For each point $\zeta_M(\phi_k)$ of the profile M it is possible to have a different value S, namely values $\zeta_W(\phi_n)|_{sup}$, $\zeta_W(\phi_n)|_{inf}$ calculated with S being a function of the k-th sample, namely $S=S(\phi_k)$, or $S=S_M(\phi_k)$ if the values of S are stored.

More simply, it is possible to use a number of values S less than n. The range [0, n] is divided into j subsets and tolerance threshold values $S_i(\phi_k)$ are defined, each of these being valid in a corresponding j-th subset. Also the set $\phi_n$ is therefore partitioned and in each j-th subset of $\phi_n$, during the manoeuvre, the following are calculated:

for control as to the range W being exceeded, the values $\zeta_W(\phi_k)|_{sup}=\zeta_M(\phi_k)+S_i(\phi_k)$ and $\zeta_W(\phi_k)|_{inf}=\zeta_M(\phi_k)-S_i(\phi_k)$; and furthermore a "response risk" value, i.e. a value which expresses by how much $\zeta(\phi_k)$ was close to the values $\zeta_W(\phi_k)|_{sup}$, $\zeta_W(\phi_k)|_{inf}$. Firstly it is checked whether the measured value $\zeta(\phi_k)$ is greater or smaller than the value of the profile $\zeta_M(\phi_k)$ (or the equivalent value obtained from the average of $\zeta_W(\phi_k)|_{sup}$, $\zeta_W(\phi_k)|_{inf}$ is not mapped).

On the basis of this logic operation it is established which formula to use from the following:

Case $\zeta(\phi_k)>\zeta_M(\phi_k)\rightarrow$Response Risk Index
$$RRI(\phi_k)=|\zeta_W(\phi_k)|_{sup}-\zeta(\phi_k)|, \quad 1)$$

Case $\zeta(\phi_k)<\zeta_M(\phi_k)\rightarrow$Response Risk Index
$$RRI(\phi_k)=|\zeta(\phi_k)-\zeta_W(\phi_k)|_{inf}|. \quad 2)$$

The closer $RRI(\phi_k)$ is to zero the greater the "response risk" because the value measured $\zeta(\phi_k)$ has approached the associated range value $\zeta_W(\phi_i)|_{sup}$, or $\zeta_W(\phi_i)|_{inf}$. The sum $$\sum_{r=p}^{q} IRI(\varphi_r)$$

of all the indices RRI($\phi_k$) for the j-th subset with (q-p) members determines the overall risk of that subset; if the risk is high (above a given value) then the values $S_i(\phi_k)$ are increased in order to increase the range W; if the risk is low (below a given value) then the values $S_i(\phi_k)$ are reduced in order to reduce the range W; otherwise the range W remains unvaried.

In any case it would also be possible to use also a single threshold, valid for the entire subset $\phi_n$, provided that it can be updated.

Variant III ($\Psi \equiv \sigma$)

The invention may envisage the option of performing updating of the values $\zeta_W(\phi_k)$ or of the mapping M with each manoeuvre of the roller shutter on the basis of arithmetic-logic operations which have as operands the values of one or more accessory or collateral parameters $\sigma$ not directly relating to operation of the actuating system but to the external environment (i.e. which are different from those values identified above by $\zeta$), these parameters also being preferably stored during a manoeuvre or part of a manoeuvre.

It is possible to detect said parameters once at the end of a manoeuvre (for example temperature) or detect and process said parameters so as to create a second mapping of another parameter $\sigma$, and the stored values thereof $\sigma_M$ and the deviations from the current values $\sigma$ are used to decide whether to update $\zeta_M(\phi)$ and/or the values of the range W. The second mapping may be created as a function of the travel movement $\phi$ or as a function of the time. In this latter case, the value of the parameter $\sigma$ is acquired at regular intervals.

Let us consider the case where samples of $\sigma$ are acquired along the travel path $\phi$ of the roller shutter. This therefore gives, with reference to the general case, $\Psi \equiv \sigma$, $\Psi_M(\phi) \equiv \sigma_M(\phi)$.

Obviously, updating may also take into consideration simultaneously several parameters $\sigma_1, \sigma_2, \ldots \sigma_m$, each independently and/or then combined during processing.

By way of example of a second accessory parameter a the temperature T is considered here. Other examples are the speed of the wind, direct irradiation of the sun which may deform the materials, or the atmospheric humidity, useful for establishing whether there may be frost on the guides. Therefore in this case $\sigma \equiv T$.

It must be mentioned that one of the phenomena which most affects the torque required to move a blind is in fact the temperature. In relation to the average room temperature of 25° C., a temperature which is higher (within certain limits) tends to make mechanisms more fluid. Beyond these limits heat expansion phenomena may occur and tend again to cause stoppage of the mechanisms. Temperatures below room temperature tend to brake the mechanisms; and below zero there may be risk of ice formation which may stop the movement.

Temperature variations may also be decisive: consider, for example, a holiday home which is used in summer (temperature 40°) and then in winter (temperature −10° C.). It is clear that the mapping M and the values of the range W obtained in summer are not particularly useful in winter; on the contrary, there is the risk of the protection system being activated during the first manoeuvre. Another example: in cold locations a sliding gate may have ice or frost on the guides, which forms as a result of the night-time moisture and which sometimes may not even melt during the day. Leaving aside extreme cases, even in the case of a house situated in a mild climate, the temperature variations of a blind exposed to direct sunlight may be very great.

The invention preferably envisages that the electronic board contained in the (tubular) motor of the actuating system is provided with a temperature sensor (typically an NTC component or a diode) and a suitable circuit (for example a polarization resistor and an A/D converter). At the end of manoeuvre of the shutter, the temperature measured at that moment $T(\phi_k)$ is acquired and its value $T_M(\phi_k)$ is stored. Acquisition of the temperature may simply be performed once only during a manoeuvre, and therefore the series $T(\phi_n)$, $T_M(\phi_n)$ correspond in reality to a single value because for the sake of simplicity the value n=k=1 has been chosen.

At the start of the next manoeuvre the temperature $T(\phi_k)$ is acquired again. If the temperature $T(\phi_k)$ is similar to $T_M(\phi_k)$ (e.g. within a deviation of 0−±3%) then no adjustment is made and the manoeuvre starts using the main mapping M and/or the stored range W.

Vice versa, the mapping M and/or the range W may instead be modified in accordance with the criteria given in the table, shown by way of example in FIG. 1. For example, if the temperature $T_M(\phi_k)$ was 40° C. (cell 35-55° C.) and with the new manoeuvre the temperature $T(\phi_k)$ is 20° C. (cell 15-35° C.) then there has been a variation (cf. symbols <<) classified as "+10%" which corresponds to an adjustment of all the values of the map $\zeta_M(\phi_n)$ e.g. by +10% (or likewise increasing or reducing in an appropriate manner $\zeta_W(\phi_n)|_{sup}$ e $\zeta_W(\phi_n)|_{inf}$ respectively). Vice versa, if the temperature $T_M(\phi_k)$ was −5° C. (cell <0° C.) and with the new manoeuvre the temperature $T(\phi_k)$ is 20° C., then there have been 2 variations (cf. symbols >>), the first being classified as "−20%" and the second as "−10%", which correspond to an adjustment of all the values $\zeta_M(\phi_n)$ e.g. by −30%. The same occurs if $\zeta_W(\phi_n)|_{sup}$ and $\zeta_W(\phi_n)|_{inf}$, are modified. Essentially, it is possible to modify $\zeta_W(\phi_n)|_{sup}$ and $\zeta_W(\phi_n)|_{inf}$ so as to widen or narrow the range W, depending on whether the temperature $T(\phi_n)$ is greater or less than $T_M(\phi_k)$.

The same method of adjustment can be easily applied to the case where $\sigma$ is sampled as function of the time: it is sufficient to consider as terms $T_M(\phi_k)$ and $T(\phi_k)$ the sample $\sigma_M(t_{k-1})$ stored previously at the instant $t_{k-1}$ and the actual sample $\sigma(t_k)$ acquired at the instant $t_k$. The sequence of instants $t_y$, where $0 \leqq y \leqq P$, may be at regular or irregular intervals, within a generic time interval P.

Variant IV ($\Psi \equiv X$)

All the variants described above have the aim of increasing as far as possible the sensitivity to sensing of obstacles without, on the other hand, producing false responses/interventions.

Despite everything, however, a false intervention may always occur. There are many reasons for which the real torque required in order to perform the manoeuvre is not that which would be expected: for example a blind may be slightly frozen and blocked by a few drops of frozen water.

A false response is the most undesirable situation for a user. Not managing to close a blind when leaving home may result in the person requesting replacement of the actuating system because he/she thinks it is defective when it is in fact still functioning.

The fact that it is not possible to avoid false responses means that it is at least necessary to allow the movement as far as possible. On the other hand it is important to avoid overstressing the mechanisms of the actuating system so as not to cause failure thereof.

The method according to the invention is as follows: with each manoeuvre a value (preferably a digital value) $\Psi_M$ corresponding to the variable $\Psi$=direction of the last travel movement of the roller shutter, is stored. If the obstacle sensor has been activated, the logic operation is performed to verify whether the next manoeuvre is performed in the same direction as the previous manoeuvre (the user continues to execute the command in the same direction). Namely, the value $\Psi_M(\phi_n)$ (here also n=1) of the current direction is acquired and compared with $\Psi_M(\phi_n)$. The values $\Psi(\phi_n)$ and $\Psi_M(\phi_n)$ may be simply the value of a bit derived with logic functions by an incremental encoder or information already known contained inside a microprocessor which drives the actuating system.

If the values of $\Psi(\phi_n)$ and $\Psi_M(\phi_n)$ are the same, the values $\zeta_W(\phi_n)|_{sup}$ and $\zeta_W(\phi_n)|_{inf}$ of the range W (or the values S to be added with sign to $\zeta_M(\phi_n)$) are modified in order to increase slightly (e.g. +10%) the width of the range W. If, despite the increase in the range W, there should be renewed activation of the protection system, the range W will again be increased and so on until the condition where the motor produces the maximum torque is reached. This method takes into account two human reactions which are fairly natural: if, after giving a command, the desired result is not achieved, normal human instinct is to try again: moreover these series of attempts will take place while the person who is giving the command is standing in the vicinity of the blind (otherwise it would not be possible to check whether the command has been completed successfully) and therefore the person concerned will notice if there are any obstacles present and that the force is gradually increasing (and can therefore decide whether to stop or continue with the attempts). When the operation is concluded (i.e. the end-of-travel stop is reached), the range W is readjusted to its normal value.

Advantageously the method may envisage an increase of the tolerance thresholds S when a start or movement command (in the same direction) is received within a few seconds (e.g. 5 or less) of activation of the obstacle-sensing system.

Variant V ($\Psi \equiv \phi$)

Another typical problem of actuating systems with mapping M is the starting manoeuvre and in particular stopping and re-starring at a point within the working travel path.

As is known, any mechanical system at start-up requires a considerable initial torque in order to overcome the static friction. At the start of the manoeuvre other variable factors may also occur until the motor and the blind have reached the working speed.

All this means that, if the start-up occurs at an intermediate point within the working travel path (not in the end-of-travel positions), the torque values $\zeta(\phi_n)$ detected in real time will certainly be different from $\zeta_M(\phi_n)$ (detected during an operation with start and arrival from one end-of-travel point to the other end-of-travel point) and therefore the obstacle-sensing system will be activated.

One method commonly used is to deactivate the obstacle-sensing system for a given dead time (for example 2s) or dead distance (for example 20 cm) so as to "bypass" the start-up phase.

Unfortunately this deactivation period must be sufficiently long to ensure correct starting and, since it is necessary during the design stage to consider the worst scenario even in systems with a short start-up, the obstacle sensing system remains inactive for too long a time and therefore this may be dangerous.

It would be useful to provide a method for detecting correct start-up.

The method according to the invention is as follows.

Typically the torque $\zeta(\phi_n)$ necessary for starting has a dampened oscillation configuration, with various oscillations above and below the mean torque until the working torque is stabilized.

At start-up the actual value of the variable $\phi$, called $\phi_x$, namely the position of the roller shutter at the rest point, is acquired. By comparing $\phi_x$ with the data memorized for $\phi$ in the end-of-travel positions, the device deduces that the roller shutter is at a point in between them (algebraic comparison) and follows the following procedure. The comparison is not necessary should $\phi_x$ be derived from an encoder reading.

The tolerance thresholds S, as function of $\phi_k$ or not, are copied in the memory, the copies being called $S_c$, and then altered to a limit end-of-scale value by which the range W has the maximum possible amplitude. In this way the obstacle-sensing device is virtually disabled and in fact does not respond.

The start-up transient may be regarded as concluded when both the peak values of $\zeta(\phi_n)$ (minimum and maximum values, $p_{min}$ e $p_{max}$) fall within the range W. By processing the values $\zeta(\phi_k)$ it is possible to deduce the progression of $\zeta(\phi_n)$ and detect the peaks within the oscillation (checking whether they are within the range W requires only a numerical comparison operation).

The upper peak may be detected by comparing the last measured value $\zeta(\phi_k)$ with the previously measured value $\zeta(\phi_{k-1})$:

if $\zeta(\phi_k)$ is greater than $\zeta(\phi_{k-1})$ then $\zeta(\phi)$ is increasing and the value $\zeta(\phi_k)$ replaces $\zeta(\phi_{k-1})$;

if $\zeta(\phi_k)$ is less than $\zeta(\phi_{k-1})$ this means that probably a reduction of $\zeta(\phi)$ is in progress and that the value $\zeta(\phi_{k-1})$ could be the value $p_{max}$ of a peak; a "peak reached" flag is then set.

The peak is convalidated when the reversal in tendency of $\zeta(\phi)$ is repeatedly confirmed, for example for 5 times the value measured $\zeta(\phi_k)$ is always less than the peak value $p_{max}$. The lower peak is detected using the same technique as for the upper peak, with obvious modifications.

When both the peak values $p_{max}$ and $p_{min}$ are convalidated and are within the range W (e.g. $p_{max}$ and $p_{min}$ are compared with the values $\zeta_M(\phi_k) \pm S_c$), this means that die oscillation is contained within the range W.

From this instant onwards obstacle sensing may be activated on the basis of the mapping M, re-copying the values $S_c$ into the values S initially altered.

This method has the advantage of anticipating activation of the obstacle sensor; time-based activation may nevertheless remain active. One or more consecutive rapid variation signals indicate that an impact is taking place and that the motor must therefore be stopped.

All the variants described may obviously be in corporated in the device and/or in the actuating system on their own or in combination.

Finally, in order to facilitate understanding, a list of the symbols used and their meaning is provided:

$\zeta$=parameter relating to operation of the roller shutter, for example, the electric current, the electric power, the speed or the torque generated by the motor, or the resistive torque affecting the roller shutter and/or the motor. The function $\zeta$ may indicate, in addition to these parameters, similar electrical and/or mechanical parameters. Preferably in the description the function $\zeta$ indicates the driving torque in order to obtain a certain speed profile of the roller shutter.

$\phi$=position of the roller shutter within its travel path;

$\phi_n$=set of sampled positions of the roller shutter within its travel path (n=number of samples);

$\phi_k$=k-th sampled position of the roller shutter within its travel path, used to indicate a generic position;

$\zeta(\phi_k)$=parameter sample/acquired in real time and in correspondence of a k-th position in the set $\phi_n$;

$\zeta(\phi_n)$=parameter sampled/acquired in real time for all the n positions, namely a profile of $\zeta$;

$\zeta_M(\phi_n)$=memorized/stored value of $\zeta(\phi_n)$;

$\zeta(\phi)$=parameter $\zeta$ with a generic dependency on $\phi$;

$\zeta_W(\phi_n)|_{inf}$ and $\zeta_W(\phi_n)|_{sup}$=set n lower and upper values in an intervention range, indicated overall by $\zeta_W(\phi_n)$;

$\zeta(\phi_k)|_1\zeta(\phi_k)|_2$=particular values of $\zeta(\phi_n)$ considered for the same values of $\phi_k$ in two different cases;

$\zeta_W(\phi_k)$=values of the range W calculated in $\phi_k$;

S=maximum value of deviation from the values $\zeta_M(\phi_n)$ (amplitude of the range W);

$S(\phi_k)$=k-th value of the maximum deviation from the values $\zeta_M(\phi_k)$ when S is a function of $\phi$ (local amplitude of the range W);

$S_1$=auxiliary threshold;

$S_2$=auxiliary threshold;

$\Psi$=generic variable;

$\Psi_M$=memorized/stored value of $\Psi$;

$\Psi(\phi_k)$=k-th value of $\Psi$ measured in real time and in correspondence to the k-th value $\phi_k$;

$\Psi(\phi_n)$=variable $\Psi$ sampled/acquired in real rime and in correspondence to all the n positions, namely a profile of $\Psi$;

$\Psi_M(\phi_n)$=memorized value(s) of $\Psi(\phi_n)$;

$\sigma$=parameter relating to operation of the actuating system different from $\zeta$ and relating to the external environment.

$\sigma(\phi_k)$=acquired k-th value of $\sigma$ in correspondence to the k-th value $\phi_k$;

$\sigma_M(\phi_k)$=memorized value of $\sigma(\phi_k)$;

X=generic internal variable of the control system of the actuating system;

$X(\phi_k)$=k-th value of X acquired in correspondence to the k-th value $\phi_k$;

$X_M(\phi_k)$=memorized value of $X(\phi_k)$;

$RRI(\phi_k)$=k-th value of the function "response risk" calculated for the k-th value $\phi_k$;

T=temperature;

$T(\phi_k)$=temperature acquired in real time and in correspondence to the k-th value $\phi_k$;

$\sigma(t_k)$=sample of a acquired at the instant $t_k$;

$\sigma_M(t_k)$=memorized sample, of $\sigma(t_k)$;

$t_k$=generic sampling instant;

P=generic time interval.

The invention claimed is:

1. A motor-driven actuating system for a roller shutter or a sliding barrier, the system comprising:

an obstacle sensing safety device comprising a sampler for taking, at position intervals, a plurality of reference values of at least one main physical parameter ($\zeta$) along a travel path of the roller shutter or the sliding barrier, the at least one main physical parameter ($\zeta$) relating to an operation of the actuating system;

a profiler for generating from the plurality of reference values a reference profile of the at least one main physical parameter ($\zeta$) along the travel path; and a processor for calculating a deviation between a value of the reference profile at an evaluation point and values of the at least one main physical parameter ($\zeta$) acquired in real time, the processor modifying the operation of the actuating system depending on the deviation;

wherein the processor processes a logic operation having as an operand at least the value ($\Psi_M(\phi_k)$) of a variable ($\Psi$) acquired in real time and modifies the reference profile using the value ($\Psi_M(\phi_k)$) of the variable ($\Psi$), and previously stored values.

2. Actuating system according to claim 1, wherein said previously stored values consist of pre-stored constants or the points of the reference profile.

3. The actuating system of claim 2, wherein a plurality of thresholds are associated with the reference profile and modifying the operation of the actuating system occurs only when the deviation is greater than a corresponding threshold.

4. The actuating system of claim 3, wherein the evaluation point is a rest point of the roller shutter or sliding barrier.

5. Actuating system according to claim 4, wherein the processor alters the tolerance thresholds (S) to a limit end-of-scale value to disable virtually the sensing of obstacles prior to starting of the roller shutter.

6. Actuating system according to claim 5, designed to process the values ($\zeta(\phi_k)$) of the main physical parameter in order to detect peak values thereof and re-enable the obstacle sensing system when said peak values are less than the tolerance thresholds.

7. Actuating system according to claim 1, wherein the arithmetic logic operation with at least one operand consisting of a stored value ($\Psi_M(\phi_k)$) of the said variable ($\Psi$) acquired in real time, said variable ($\Psi$) corresponding to the main physical parameter.

8. Actuating system according to claim 7, wherein the processor calculates the deviation between a value ($\zeta(\phi_k)$) acquired for the main parameter during the actual maneuver and the associated stored value ($\zeta_M(\phi_k);\zeta_W(\phi_k)|_{sup}$, $\zeta_W(\phi_k)|_{inf}$), and, on the basis of the magnitude of the deviation calculated, modify or not the stored value ($\zeta_M(\phi_k)$) by adding to it or subtracting from it a percentage thereof.

9. Actuating system according to claim 8, wherein the processor modifies said associated tolerance thresholds (S) by evaluating or processing the deviation at least between a value ($\zeta_M(\phi_k)$) for the main parameter acquired during the actual maneuver and the associated stored value ($\zeta_M(\phi_k);\zeta_W(\phi_k)|_{sup}$, $\zeta_W(\phi_k)|_{inf}$), said associated tolerance thresholds (S) being organized in a set of threshold values associated uniquely with the set of positions ($\phi_n$) of the roller shutter.

10. Actuating system according to claim 9, wherein the processor modifies each of said threshold values according to the result of a sum of deviations between values ($\zeta(\phi_k)$) acquired for the main parameter during the actual maneuver and associated stored values ($\zeta_M(\phi_k);\zeta_W(\phi_k)|_{sup}$, $\zeta_W(\phi_k)|_{inf}$).

11. Actuating system according to claim 1, wherein the variable ($\Psi$) acquired in real time corresponds to a secondary physical parameter relating to the external environment of the actuating system.

12. Actuating system according to claim 1, wherein the variable ($\Psi$) acquired in real time corresponds to the temperature and/or to direct irradiation of the sun on the roller shutter and/or to the external humidity.

13. Actuating system according to claim 12, wherein a profile a set of samples of the secondary physical parameter acquired in correspondence of the set of positions of the roller shutter and/or as a function of the time is saved.

14. Actuating system according to claim 13, wherein the deviation between at least a stored value ($\sigma_M(\phi_n)$; $\sigma_M(t_{k-1})$) of the secondary parameter and an associated value acquired in real time ($\sigma(\phi_n)$; $\sigma(t_k)$) is processed, and consequently decide if and how to modify the values of the profile ($\zeta_M(\phi_n)$ and/or the threshold values (S).

15. Actuating system according to claim 14, further comprising a temperature sensor and associated acquisition circuit.

16. Actuating system according to claim 15, wherein the variable ($\Psi$) acquired in real time corresponds to an internal state variable of the processing means, preferably the content of memory locations, the value of which expresses the direction of the last travel movement of the roller shutter.

17. Actuating system according to claim 16, wherein upon starting of the roller shutter a value of the actual direction is acquired, comparing it with the associated stored value ($\Psi_M(\phi_n)$), the equivalence between them resulting in a temporary variation of said associated tolerance thresholds (S) after a movement/start command has been received within a few seconds following response/activation of the obstacle-sensing device, if previously there has been an intervention of the obstacle-sensing protection system.

18. A method of improving an efficiency of a motor-driven actuating system for roller shutters or sliding barriers, the method comprising the steps of:

(a) taking,
at position intervals, a plurality of reference values of at least one main physical parameter (ζ) along a travel path of the roller shutter or the sliding barrier, the at least one main physical parameter (ζ) relating to an operation of the actuating system;

(b) generating from the plurality of reference values a reference profile of the at least one main physical parameter (ζ) along the travel path; and (c) calculating a deviation between a value of the reference profile at an evaluation point and the at least one main physical parameter (ζ);

(d) modifying the operation of the actuating system depending on the deviation;

wherein step (d) comprises processing a logic operation having as an operand at least the value ($\Psi_M(\phi_k)$) of a variable (Ψ) acquired in real time and modifies the reference profile using the value ($\Psi_M(\phi_k)$) of the variable (Ψ), and previously stored values.

19. Method according to claim 18, wherein the said previously stored values consist of pre-stored constants and/or the points of the stored profile.

20. The method of claim 19, wherein a plurality of thresholds are associated with the reference profile and modifying the operation of the actuating system occurs only when the deviation is greater than a corresponding threshold.

21. The method of claim 20, wherein the evaluation point is a rest point of the roller shutter or sliding barrier.

22. Method according to claim 21, wherein the tolerance thresholds (S) are altered to a limit end-of-scale value to disable virtually the sensing of obstacles prior to starting of the roller shutter.

23. Method according to claim 22, wherein the values ($\zeta(\phi_k)$) of the main physical parameter are processed in order to detect peak values thereof and re-enable the obstacle sensing system when said peak values are less than the tolerance thresholds.

24. Method according to claim 18, wherein the logic operation is executed with at least one further operand consisting of a stored value ($\Psi_M(\phi_k)$) of the said variable (Ψ) acquired in real time, in which the main physical parameter is acquired as the variable (Ψ) acquired in real time.

25. Method according to claim 18, further comprising modifying at least one of the previously stored values based on a magnitude of the deviation.

26. Method according to claim 20, wherein the associated tolerance thresholds (S) are modified by evaluating or processing the deviation at least between the at least one main physical parameter and a reference value of the reference profile at the evaluation point, said associated tolerance thresholds (S) being organized in a set of threshold values ($Si(\phi_k)$) each associated uniquely with a subset of the positions ($\phi_n$) of the roller shutter.

27. Method according to claim 26, wherein each of said threshold values (S) is modified according to a result of a sum of deviations between values ($\zeta(\phi_k)$) acquired for the at least one main physical parameter (ζ) and the reference value of the reference profile at the evaluation.

28. Method according to claim 20, wherein a secondary physical parameter (σ) relating to the external environment of the actuating system is acquired as the variable (Ψ) acquired in real time, said variable ( ) being the temperature (T) and/or the direct irradiation of the sun on the roller shutter and/or the degree of external humidity.

29. Method according to claim 28, wherein a set of acquired samples of the secondary physical parameter, (σ) in correspondence of the set of positions ($\phi_n$) of the roller shutter and/or as a function of the time ($t_k$, P), is stored in a profile.

30. Method according to claim 29, in which an internal state variable of processing means of the actuating system, the contents of memory locations, or a state variable, the value of which expresses the direction of the last travel movement of the roller shutter, is acquired as the variable (Ψ) acquired in real time.

31. Method according to claim 30, in which the value (Ψ) of the actual direction is acquired upon starting of the roller shutter, comparing it with the associated memorized value ($\Psi_M(\phi_n)$), the equivalence between them resulting in a temporary variation of said associated tolerance thresholds (S), after a movement/start command has been received within a few seconds following response/activation of the obstacle-sensing device and in which said temporary variation is incremented if previously there has been an intervention of the obstacle-sensing protection system.

* * * * *